United States Patent [19]

Abu-Isa

[11] 4,111,885

[45] Sep. 5, 1978

[54] SYNERGISTIC FIRE RETARDANT ADDITIVES FOR PLASTICIZED POLYVINYL CHLORIDE CONSISTING ESSENTIAL OF BORIC ACID AND ZINC OXIDE OR ZINC PHOSPHATE

[75] Inventor: Ismat A. Abu-Isa, Birmingham, Mich.

[73] Assignee: General Motors Corporation, Detroit, Mich.

[21] Appl. No.: 818,439

[22] Filed: Jul. 25, 1977

[51] Int. Cl.$^2$ .................. C08J 3/18; C08K 3/22; C08K 5/09
[52] U.S. Cl. .................. 260/31.8 R; 260/45.75 W
[58] Field of Search ............... 260/31.8 R, 45.75 W, 260/45.7 R

[56] References Cited

U.S. PATENT DOCUMENTS

| | | | |
|---|---|---|---|
| 2,617,783 | 11/1952 | Slocombe et al. | 260/45.7 R |
| 2,949,439 | 8/1960 | Fuchsman et al. | 260/45.75 W |
| 3,131,164 | 4/1964 | Doyle et al. | 260/45.7 R |
| 3,375,209 | 3/1968 | Kemper | 260/31.8 R |
| 3,524,761 | 8/1970 | Humphrey | 117/138 |
| 3,718,615 | 2/1973 | Woods et al. | 260/45.75 W |
| 3,933,742 | 1/1976 | Dickens | 260/45.75 W |
| 3,945,974 | 3/1976 | Schwarcz et al. | 260/31.8 R |
| 3,957,723 | 5/1976 | Lawson et al. | 260/45.75 W |
| 3,965,068 | 6/1976 | Dickens | 260/45.75 W |
| 4,076,682 | 2/1978 | Theysohn et al. | 260/45.75 W |

*Primary Examiner*—Herbert J. Lilling
*Attorney, Agent, or Firm*—George A. Grove

[57] ABSTRACT

In a preferred embodiment, polyvinyl chloride resin plasticized with aliphatic carboxylic acid esters is imparted with superior flame and fire retardancy by a synergistic fire retarding additive. The additives of the invention comprise boric acid in combination with zinc oxide and/or zinc phosphate. These constituents together provide greater fire retardancy to the plasticized PVC than the sum of the effects of each constituent employed alone.

3 Claims, No Drawings

SYNERGISTIC FIRE RETARDANT ADDITIVES FOR PLASTICIZED POLYVINYL CHLORIDE CONSISTING ESSENTIAL OF BORIC ACID AND ZINC OXIDE OR ZINC PHOSPHATE

This invention pertains to synergistic flame and fire retarding systems for plasticized polyvinyl chloride (PVC) resins. More particularly, this invention relates to combinations of boric acid and zinc oxide and/or zinc phosphate constituents which impart superior fire retardancy to PVC polymers plasticized with aliphatic dicarboxylic acid ester plasticizers. Synergistic fire retarding additives according to my invention are combinations of these constituents whereby the fire retarding effects provided to a plasticized PVC resin are greater than the sum of the effects provided by each of the constituents alone.

Pure polyvinyl chloride is inherently fire resistant and self-extinguishing because of its high chlorine content. However, when PVC is plasticized with flammable organic compounds to form flexible polymers for cable coatings, wall coverings, or upholstery fabrics, etc., the addition of a fire retarding agent is often necessary.

Among the more common PVC plasticizers, particularly those used in compounding vinyl upholstery fabrics, are the acid esters of aliphatic dicarboxylic acids such as dioctyl adipate and dioctyl sebacate. My invention particularly pertains to PVC resins plasticized with compounds which are the polyester reaction products of aliphatic dicarboxylic acids and mono- or polyfunctional aliphatic alcohols. A particular plasticizer of this type is selected for a given application in order to impact desired softening characteristics to a PVC resin.

Before this invention, commonly known fire retarding systems for plasticized PVC included chlorinated paraffins, antimony oxides, and certain phosphate esters. Small percentages by weight of antimony oxide added to flexible PVC greatly improve its flame resistance. However, antimony oxide is expensive. It is also well known that certain phosphate esters and chlorinated paraffins can replace a portion of the plasticizing system in the PVC to improve its flame resistance, but these compounds are also costly. Zinc borates have shown some benefit as part-for-part replacement of antimony oxide, but their fire retarding efficiency is relatively poor.

It is an object of this invention to provide a fire and flame retarding polyvinyl chloride composition, plasticized with carboxylic acid esters, employing a synergistic flame and fire retarding additive comprised of readily available inexpensive and easy-to-process constituent materials. I employ as my flame retardant additive a mixture of boric acid and zinc oxide and/or zinc phosphate. The fire retarding effects provided to plasticized PVC by the combined constituents of my additives are much better than what would be expected from the sum of the effects provided to such resins by each separately or zinc borates.

In accordance with a preferred embodiment of my invention, these and other objects are accomplished as follows. Polyvinyl chloride resin granules, a plasticizer, and a heat processing stabilizer are all thoroughly mixed and masticated in a suitable roller mill by procedures well known in the art. The plasticizer is one or a combination of aliphatic dicarboxylic acid esters. The components of the fire retardant additives of this invention are then added to the softened plasticized PVC and thoroughly mixed therewith. These components are boric acid and zinc oxide and/or zinc phosphate. Preferably the boric acid and zinc compound are used in approximately equal proportions by weight with respect to each other. However, as much as two parts of one ingredient per part by weight of the other have been successfully employed to produce a synergistic fire retarding additive. I have no experience that would indicate that even more disproportionate mixtures of boric acid and zinc compound(s) could not be beneficially used in as flame and fire retardant additives for PVC resins plasticized with carboxylic acid esters. I have also found that as little as 3 parts by weight of my additive per 100 parts by weight polyvinyl chloride resin (not including plasticizer or other additives) provide substantial improvement in the fire retardancy. No antimony oxide or other expensive conventional additives need be employed.

Plasticized PVC compositions containing the subject additive have been tested and found to be quite resistant to fire and to the spreading of fire. Surprisingly, the use of only one of the constituents—boric acid, zinc oxide or zinc phosphate—in a plasticized PVC did not significantly improve the flame retardant capacity of the PVC composition. However, mixtures of boric acid and either zinc oxide or phosphate produced unexpected synergistic fire retarding effects in aliphatic ester plasticized PVC compositions.

My unique synergistic additives and their use for improving the flame retardancy of plasticized polyvinyl chloride will be more clearly understood by the following specific examples. The polymer samples in the following examples were all prepared as follows.

Polyvinyl chloride granules were mechanically mixed with the specified aliphatic dicarboxylic ester plasticizer. The mixture was then masticated on a two-roll mill heated to a temperature of about 140° C. After the granules had softened and sheeted on the mill, a heat stabilizer was added. PVC is generally compounded with such stabilizers to give adequate processing stability. The stabilizers employed in the following examples were lead monoxide (litharge) and lead phosphate, sold under the trade name Dyphos®, both marketed by National Lead Company, and a bisphenol A epoxy resin (DER 331) sold by Dow Chemical Company. Although these particular stabilizers were employed in the examples, the choice of stabilizer does not appear to effect the synergistic properties of our additive. Therefore, other heat stabilizers could be successfully employed in the practice of the invention.

After the stabilizer was thoroughly mixed with the sheeted plasticized PVC resin, various powdered materials to be evaluated as retardant additives were milled in. Such PVC compositions were then stripped off the mill and formed into sheets. The sheets were cut to test bar size and compression molded into 6.35 × 12.7 × 127 mm bars for flame retardancy evaluation. The compression molding was carried out by preheating the test bars in the mold at 150° C. for 10 minutes, then compression molding at 150° C. for 5 minutes and cooling the bars in the mold.

Flammability testing was carried out by measuring the limiting oxygen index (LOI) for each sample bar in a flammability gauge apparatus manufactured by General Electric. The test method is fully specified in ASTM D2863 and is a procedure for determining the relative flammability of molded test bars by measuring the minimum concentration by volume of oxygen in a flowing mixture of oxygen and nitrogen that will just sustain flaming combustion in a sample bar. The LOI is expressed as a number which is the percent oxygen in the sustaining oxygen-nitrogen mixture. For example, a plasticized PVC sample with a LOI of 23.7 would require a 23.7% oxygen concentration in nitrogen to burn continuously throughout the test without extinguishing. The higher the LOI, the more flame and fire retardant the composition.

EXAMPLE I

Referring now to Table I, the samples shown were prepared by combining by weight 100 parts PVC granules, 70 parts Plastolein ® 977, a plasticizer sold by Emery Industries, Inc., 5 parts of Dyphos, a heat stabilizer, and a total addition of 15 parts of each of various flame retardant additive candidate ingredients by the procedure set out above. Plastolein 977 is a relatively low molecular weight (1,000–2,000 Mn) polyester reaction product of azelaic acid and mono- and polyfunctional alcohols. Flammability test strips were molded as described above from the various compositions and the limiting oxygen index value for each was determined.

It can be seen from Table I that the plasticized PVC resin with no flame retardant additive has a limiting oxygen index of about 23.7. When 15 parts by weight zinc oxide was added, the LOI actually dropped to 22.9, and similarly when 15 parts zinc borate (nominally $3ZnO \cdot 2B_2O_3$) was added, it dropped to 23.2. Thus, it can be seen that neither of these ingredients when used alone added fire retardancy to the plasticized PVC. In fact, each slightly decreased the polymer fire retardancy. When 15 parts by weight boric acid was added, the fire retardancy improved only slightly to a LOI of 24.6. However, when a 1:2 mixture of 5 parts by weight of boric acid and 10 parts of zinc oxide (total — 15 parts per 100 parts PVC) were added, the limiting oxygen index of the plasticized PVC increased dramatically to 26.6, exhibiting the synergistic fire retarding effect of the combination of zinc oxide and boric acid.

Table I

| Total Additive Amount (pbw) | Flame Retardant Additive Ingredient(s) | LOI |
|---|---|---|
| Base Resin: 100 pbw PVC 70 pbw Plastolein 5 pbw Dyphos | | |
| No Additive (Control) | | 23.7 |
| 15 | ZnO | 22.9 |
| 15 | Zinc Borate | 23.2 |
| 15 | $H_3BO_3$ | 24.6 |
| 5 10 | $H_3BO_3$ ZnO | 26.6 |

EXAMPLE II

A base plasticized PVC sample resin was prepared by combining by weight 100 parts PVC granules and 70 parts Plastolein 977 on a roll mill. This mixture was heat stabilized for processing by the addition of 4 parts DER 331 and 5 parts litharge. A flame test strip was molded and the LOI of this composition was found to be 22.1. 30 parts zinc phosphate were added to a base sample otherwise compounded as above. The zinc phosphate containing PVC was molded into a test strip. The limiting oxygen index for this sample containing the zinc phosphate was found to be about 23.5, an improvement of about 1.4 in the LOI over the base.

Another sample was prepared from 100 parts PVC resin, 70 parts Plastolein 977, and 5 parts Dyphos stabilizer. This base composition was found to have a LOI of 23.7. To such a base composition 30 parts boric acid were added, and a sample was molded for testing. Its LOI was measured to be 25.9, an improvement of 2.2 over the base material.

According to my invention, 30 parts zinc phosphate and 30 parts boric acid were added to the second base composition, and a test sample was molded therefrom. The LOI was found to be 28.4, an improvement of 4.7 over the base. This improvement is substantially greater than that which would be expected from a mixture of about 30 phr boric acid (2.2) and 30 phr zinc phosphate (1.4).

EXAMPLE III

Referring to Table II, the base resin for the samples shown therein was prepared by combining by weight 100 parts PVC granules, 70 parts Plastolein 977, and 5 parts Dyphos stabilizer on a hot roll mill. Test bars were molded and the LOI of the base resin was found to be 23.7. Table II lists the LOI of various sample mixtures of this base resin and trial additives. The samples are arranged in the Table in order of increasing total additive additions. The additives were comprised of zinc borate, boric acid, zinc oxide, and zinc phosphate, the ingredients added alone or in the indicated combinations. The LOIs were determined as described above.

It can easily be seen that the higher LOI values were obtained in samples where boric acid and zinc oxide or zinc phosphate were combined as the fire retarding additive combination. Moreover, as the total amount of boric acid-zinc compound additive increases, so does the LOI value. It should be particularly noted that when zinc borate alone was added to the base resin, the LOI actually decreased indicating that zinc borate used by itself does not impart fire retardancy to plasticized PVC resin. For this reason, it does not appear that the effectiveness of the additives of my invention can be attributed to the chemical reaction of zinc oxide and boric acid to form zinc borates.

Table II

Base Resin: 100 pbw PVC 70 pbw Plastolein 5 pbw Dyphos

| Additive Amount (pbw) | | | | Total Additive Amount (pbw) | LOI |
|---|---|---|---|---|---|
| $ZnB_2O_3$ | $H_3BO_3$ | ZnO | $Zn_3(PO_4)_2$ | | |
| — | — | — | — | 0 (control) | 23.7 |
| — | — | 10 | — | 10 | 22.9 |
| — | 5 | 5 | — | 10 | 25.9 |
| — | 15 | — | — | 15 | 24.6 |
| — | — | 15 | — | 15 | 22.9 |
| 15 | — | — | — | 15 | 23.2 |
| — | 5 | 10 | — | 15 | 26.6 |
| 15 | 5 | — | — | 20 | 25.3 |
| — | 10 | 10 | — | 20 | 27.7 |
| — | 30 | — | — | 30 | 25.9 |
| — | 15 | 15 | — | 30 | 27.4 |
| — | 30 | 30 | — | 60 | 29.8 |
| — | 30 | — | 30 | 60 | 28.4 |

EXAMPLE IV

A base composition was formulated by milling together by weight 100 parts PVC, 70 parts dioctyl sebacate and 5 parts Dyphos by the procedure set out above. The LOI of the base composition was found to be 21.8. 15 parts boric acid and 15 parts zinc oxide were added to this base composition, test strips were molded, and the LOI was determined to be 24.6.

EXAMPLE V

A plasticized PVC resin was prepared by combining by weight 100 parts PVC granules, 70 parts dioctyl phthalate and 5 parts Dyphos by the procedure set out above. The composition was molded into test strips and the LOI was determined to be 23.0. To this base resin, 15 parts boric acid and 15 parts zinc oxide were added. The composition containing the additive was compression molded into test slabs and the LOI was determined to be 23.5. It can be seen from this example that the synergistic fire retarding properties imparted to PVC resins plasticized with aliphatic dicarboxylic acid esters are not seen when an aromatic acid ester is used as the PVC plasticizer.

While my invention has been disclosed in terms of specific embodiments thereof, it will be appreciated that other forms could readily be adapted by one skilled in the art. Accordingly, the scope of my invention is to be considered limited only by the following claims.

What is claimed is:

1. A fire retardant plasticized polyvinyl chloride composition comprising polyvinyl chloride resin, an aliphatic dicarboxylic acid ester plasticizer, and a fire retarding additive mixed therewith, said additive consisting essentially of boric acid and a component selected from the group consisting of zinc oxide and zinc phosphate, said boric acid and said component being added in such relative amounts that the fire retarding effect provided to the composition thereby is greater as measured by the limiting oxygen index determined by ASTM D2863 than the sum of the fire retarding effects provided by each component alone to a like composition of said polyvinyl chloride resin and said plasticizer.

2. A fire retardant plasticized polyvinyl chloride composition comprising polyvinyl chloride resin, an aliphatic dicarboxylic acid ester plasticizer, and mixed therewith at least 3 parts by weight of a fire retarding additive per 100 parts by weight of said polyvinyl chloride resin, said additive consisting essentially of boric acid and a component selected from the group consisting of zinc oxide and zinc phosphate, said boric acid and said component being added in such relative amounts that the fire retarding effect provided to the composition thereby is greater as measured by the limiting oxygen index determined by ASTM D2863 than the sum of the fire retarding effects provided by each component alone to a like composition of said polyvinyl chloride resin and said plasticizer.

3. A fire retardant plasticized polyvinyl chloride composition comprising polyvinyl chloride resin, an aliphatic dicarboxylic acid ester plasticizer, and mixed therewith at least 3 parts by weight of a fire retarding additive per 100 parts by weight of said polyvinyl chloride resin, said additive consisting essentially of boric acid and a component selected from the group consisting of zinc oxide and zinc phosphate, the weight ratio of the boric acid to said component being in the range of from about 2:1 to 1:2 such that the fire retarding effect provided to the composition by said additive is greater as measured by the limiting oxygen index determined by ASTM D2863 than the sum of the fire retarding effects provided by each component alone to a like composition of said polyvinyl chloride resin and said plasticizer.

* * * * *